(No Model.)
J. B. KIBLER.
DEVICE FOR CLEANING CISTERNS.
No. 350,536. Patented Oct. 12, 1886.
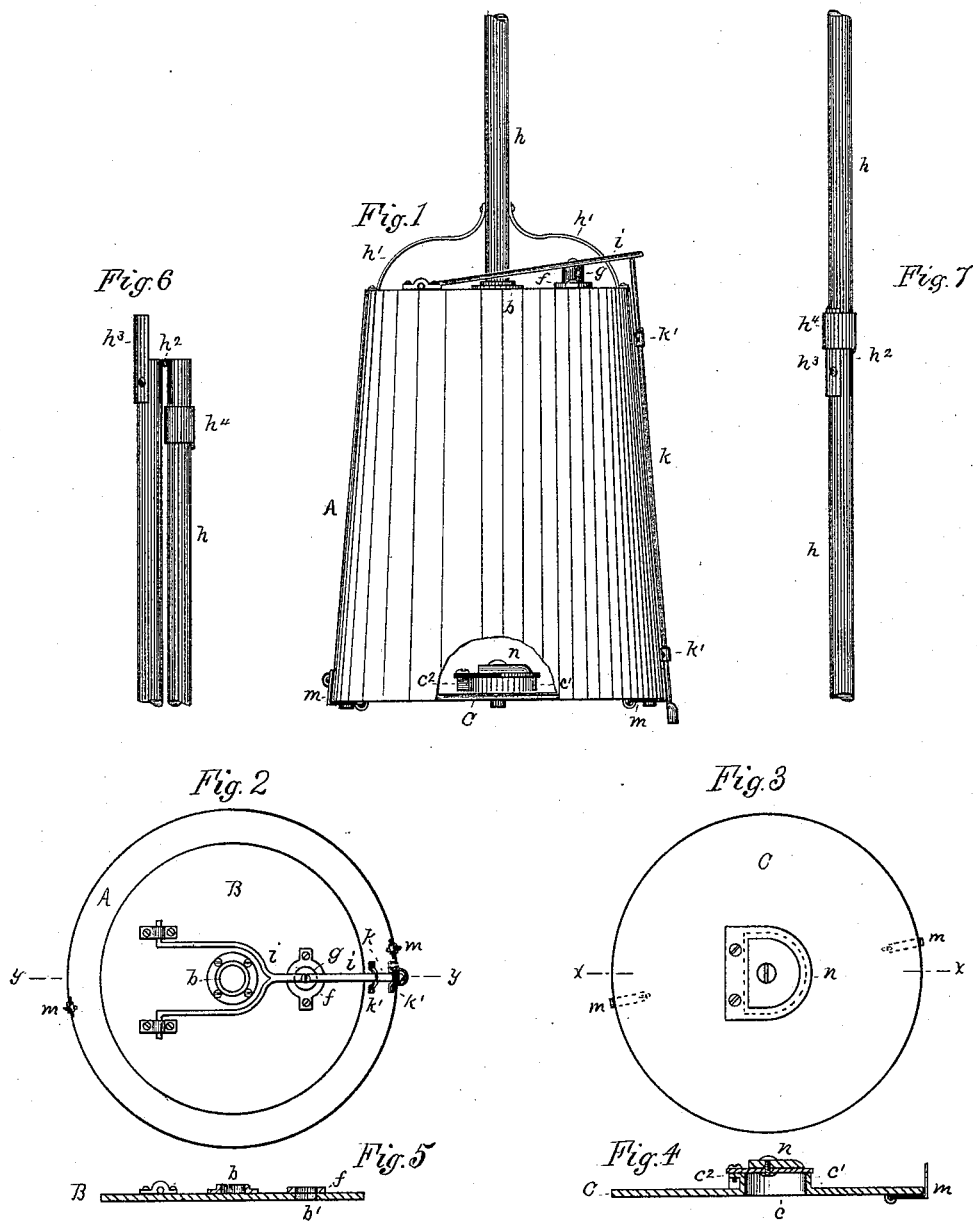
Witnesses:
Wm B. Bebb
N. G. Moran
Inventor:
John B. Kibler
By P. H. Gunckel
Attorney.

UNITED STATES PATENT OFFICE.

JOHN B. KIBLER, OF MINNEAPOLIS, MINNESOTA.

DEVICE FOR CLEANING CISTERNS.

SPECIFICATION forming part of Letters Patent No. 350,536, dated October 12, 1886.

Application filed September 1, 1886. Serial No. 212,436. (No model.)

*To all whom it may concern:*

Be it known that I, JOHN B. KIBLER, a citizen of the United States, residing at Minneapolis, in the county of Hennepin and State of Minnesota, have invented a certain new and useful Improvement in Devices for Cleaning Cisterns, of which the following is a specification.

My invention has for its object the production of a device for removing the sediment without removing the water from the cistern, and by the same operation aerating and purifying the water.

My invention is illustrated in the accompanying drawings, in which Figure 1 is a side elevation of the device. Fig. 2 is a plan view of the same with the handle of the device removed. Fig. 3 is a plan view of the bottom of the plate. Fig. 4 is a section of the same on the line $x\,x$ of Fig. 3. Fig. 5 is a section of the upper plate on line $y\,y$ of Fig. 2, and Figs. 6 and 7 are details of the jointed handle of the device.

A in the drawings represents a conical or cylindrical vessel having a fixed cover, B, and a hinged bottom, C. The cover B is provided with a socket, $b$, to receive the end of the handle or pole $h$. Braces $h'$ are provided for fastening and stiffening the handle $h$. The handle is jointed, in order that it may be lengthened, when necessary. The two parts of the handle are connected by a hinge, $h^2$. On one of the pieces is attached a half-round sleeve, $h^3$, which extends over the other piece, and a ring, $h^4$, is made to slide over the loose portion of the handle and sleeve and hold the two portions of the handle firmly together.

In the cover B is a hole, $b'$, around which is secured a ring, $f$, for a valve-seat.

$g$ is a valve for closing the opening $b'$, and is fastened to a bar, $i$, by which it is operated. The bar is forked toward its rear end, and the two forks are placed on opposite sides of the handle and hinged at the ends, so that the forward end of the bar may be raised and lowered to operate the valve.

K is a sliding rod in guides K', at the side of the vessel, and extends a suitable distance above and below it, to engage the bar $h$ and lift it when the vessel is placed on its bottom.

The bottom plate, C, is attached by hasps $m$, or otherwise hinged, so that the vessel can be opened at the bottom, when desired. In the center of the plate is an opening, $c$, surrounded by an upward flange, $c'$, forming a valve-seat, which has a straight portion, $c^2$, extending laterally for attaching a valve; and $n$ is an ordinary flap-valve fastened to the flange $c^2$ and opening inwardly.

In use the operation is as follows: The vessel being full of air and the valves closed, it is lowered into a cistern until the slide-rod K is lifted by contact with the bottom of the cistern. This causes the upper valve to open and permits the escape of the air from the vessel, which causes a strong inflow of water through the opening in the bottom of the vessel, and the suction is sufficient to draw into the vessel along with the water a considerable portion of the sediment usual in cisterns. The vessel is then withdrawn and emptied, and the operation repeated until the cistern has been sufficiently cleaned and purified.

Having described my invention, what I claim, and desire to secure by Letters Patent, is—

1. A cistern-cleaning device comprising a hollow vessel having a fixed cover and hinged bottom and a handle, valves in the cover and bottom, and a slide-rod for lifting the upper valve when the vessel is set on its base, substantially as set forth.

2. In a device for cleaning cisterns, in combination, a hollow vessel having a fixed cover and a hinged bottom, and openings in said cover and bottom, valves for said openings, a hinged bar attached to the cover-valve, and a sliding rod for lifting said rod and cover-valve when said vessel is placed on its base, substantially as set forth.

3. In combination, the vessel A, having cover B and bottom C, openings in said cover and bottom, the valves $g$ and $n$, the hinged bar $i$, the sliding rod K, hasps $m$, and jointed handle $h$, substantially as and for the purpose set forth.

JOHN B. KIBLER.

Witnesses:
N. G. HORAN.
P. H. GUNCKEL.